July 7, 1942.　　　J. R. HOTCHKIN　　　2,288,710
CAP NUT
Filed Oct. 26, 1938

INVENTOR.
James Rowland Hotchkin
BY Ramsey, Kent, Chisholm and Lutz
his ATTORNEYS Patented July 7, 1942

2,288,710

UNITED STATES PATENT OFFICE 2,288,710

CAP NUT

James Rowland Hotchkin, Short Hills, N. J., assignor to The Palnut Company, Inc., Irvington, N. J., a corporation of New Jersey Application October 26, 1938, Serial No. 236,991

4 Claims. (Cl. 85—35)

This invention relates to improvements in cap nuts, and more particularly to improvements in locking cap nuts of a type utilized to conceal the end of a bolt to which the nut is secured.

An object of the present invention is to provide a new, simple, and efficient cap nut which can be made from sheet metal and at a minimum of cost.

Another object of the invention is to provide a cap nut of the foregoing type of such construction as to have substantially flat wrench-engaging surfaces to facilitate tightening the nut on a bolt.

A further object of the invention is to provide a cap nut in which the portion concealing the end of a bolt is made up of a plurality of initially separate petal-like formations forced together to form a dome.

A still further object of the invention is to provide a cap nut of the foregoing character in which thread-engaging portions are provided of such character as to be capable of cooperating with the threads of a bolt to lock the nut thereto.

In carrying out the foregoing and other objects of the invention a cap nut made in accordance therewith is constructed from sheet metal of suitable thickness. The nut can be blanked out of a strip of metal in such fashion as to have a central aperture, the boundary edge of which is formed to provide a yielding thread-engaging edge or edges, and which blank is provided with a plurality of petal-like formations. After the blank has been stamped or otherwise cut from sheet metal, it may be formed into the desired configuration by bending the petal-like formations upwardly and into contact with the boundary edges of one petal-like formation in contact with the edges of adjacent formations so that the device assumes a cap or acorn shape. These petal-like formations may have parts of opposite edges in substantial parallelism near their bases so that when the petals are forced together these parallel edges contact to provide parallel flat wrench-engaging surfaces in the formations. In one form of the invention the thread-engaging wall of the aperture may be made with a plurality of fingers disposed to assume a helix so far as their inner edges are concerned, while in another modification of the invention the thread-engaging portion may be made by distorting the wall of the central aperture into spiral formation interrupted by a single slot.

Other features, objects and advantages of the invention will become apparent by reference to the following detailed description of the accompanying drawing, wherein Fig. 1 is a plan view of a blank cut from sheet metal and adapted to be formed into a cap locknut embodying the present invention;

Figure 1:
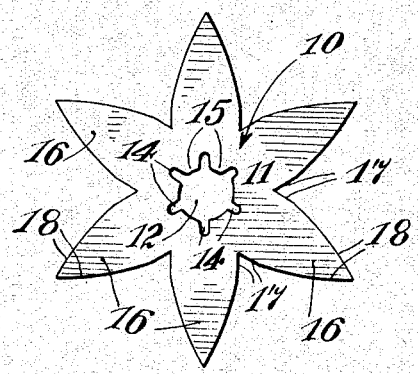

Referring now to the drawing, and particularly to Fig. 1, 10 indicates generally a blank stamped or otherwise cut from sheet metal, which blank has a body or base portion 11 provided with a central aperture 12, the edge of which has a plurality of slots or channels 14 cut therein, such channels being of graduated depth as shown. Due to the provision of these channels 14 it is possible to distort the plurality of tongues 15 into the desired shape for engaging the thread of a bolt. Extending outwardly from the body portion 11 are a plurality of petal-like formations 16, each similarly shaped. As will be seen from an inspection of the drawing, each petal-like formation has short edges 17 in substantial parallelism and extending outwardly a short distance from the root of the formation. These edges are continued into tapered edges 18 terminating at a point.

Figure 2:
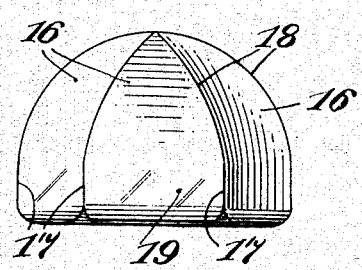
Fig. 2 is a side elevation of a finished nut.
Figure 5:
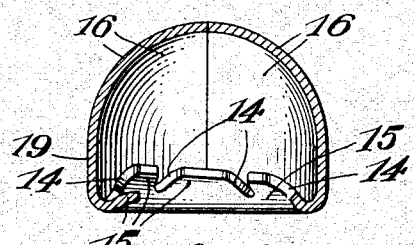
Fig. 5 is a vertical section taken substantially on the line 5—5 of Fig. 4.
Figure 3:
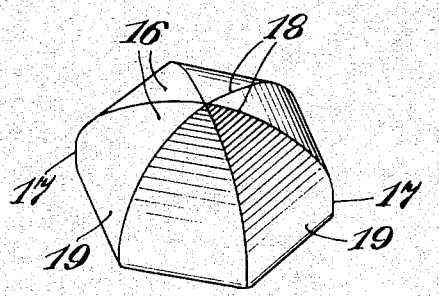
Fig. 3 is a top perspective view of the device shown in Fig. 2.
Figure 4:
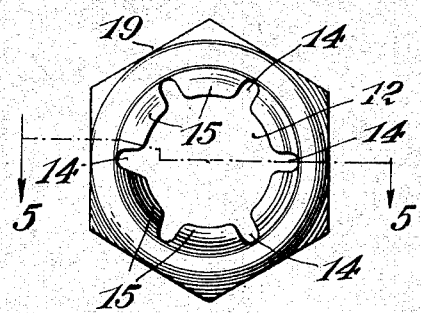
Fig. 4 is a bottom view of the same device.

After a blank has been stamped as shown, it may be further processed to cause it to assume the shape shown in Fig. 2, wherein it will be seen that the petal-like formations 16 have been pressed upwardly so that the edges of each petal-like formation are in contact with edges of adjacent formations. Due to this shaping of the device it follows that the substantially parallel edges 17 are in contact along a straight vertical line so that flat surface portions 19 in the formations result from the meeting of these parallel edges. The meeting of the tapered edges 18 results in the formation of an acorn shaped dome or cap. At the same time the body or base 11 of the device is shaped in such fashion that the tongues 15 are pressed upwardly within the confines of the nut in such fashion, as shown in the drawing, that the inner edges of the respective tongues lie along a helix from the lowermost tongue to the uppermost tongue. This helix corresponds to the pitch of the thread of a bolt with which the nut is to be associated. By reference to Figs. 4 and 6, it will be seen that the base of the device has a continuous band portion which is merged into the upstanding side wall portions and which extends inwardly from such side wall portions. This continuous band part of the base among other functions has that of reinforcing the thread engaging parts of the nut so that tendency of these parts to expand the outer wall of the nut is materially if not completely eliminated.

Figure 6:
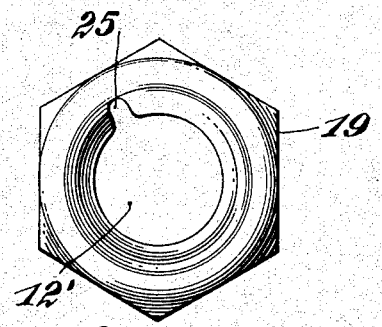
Fig. 6 is a view similar to Fig. 4 of a modification of the invention.

If desired, a device in accordance with this invention can be constructed as shown in Fig. 6 wherein the edge of the aperture 12' is provided with a single slot or groove 25. Due to the provision of this groove it is possible to distort the material of the wall surrounding aperture 12' into such shape that the edge of the aperture follows a helix which has substantially the same pitch as the thread of a bolt with which the nut is to be associated. With the exception of this difference in the bolt-engaging portion of the nut, the device of Fig. 6 is constructed in the same manner as the device of Figs. 1 to 5 inclusive.

While in the preferred form of the invention illustrated herein the petal-like formations have been shown as being provided with parallel edges 17 extending a short distance from the base of the device, it will be evident that these parallel edges may be dispensed with, in which event the petal-like formations will have their side edges tapered from the base outwardly. In this form, however, the formation will still provide surfaces suitable for engagement with a wrench to tighten the device on a bolt since the complete device has its base formed with straight edges of the desired number, which number in the present instance has been illustrated as being six.

After either of the devices shown herein have been shaped into the desired form, if they are made of relatively soft metal they are then heat treated or otherwise treated to impart to them the desired hardness and resiliency. The treatments under which these devices are processed result in the cap part of each device assuming a permanent set so that the petals cannot be separated except under the application of relatively great force, and even though they should become separated by such force they would return to contacting position upon the release of this force. If instead of making the devices initially of relatively soft metal they are made of hard rolled metal, then heat treatment or other processing of the nuts after formation in final form will not be necessary. The formation of the devices into the final form assures a complete member in which the shape has the desired permanency in the same manner that such permanency can be imparted by heat treatment as previously described. The nut of either embodiment of the invention can be used as a self-locking nut engaging a bolt to secure the bolt to some structure through which it passes, or it can be used as a locknut applied to a bolt in addition to a common nut which is previously tightened on the bolt. The device of the invention in this use thereof serves to lock the ordinary bolt in position. The only requirement is that the bolt be of such length that the entire end part thereof can be accommodated within the confines of the cap locknut.

It is to be understood that the embodiments described and shown herein are merely illustrative of the invention, and that any limitations imposed upon the invention are to be only those set forth in the following claims.

I claim:

1. A one piece preformed load sustaining nut comprising a member made from sheet metal, said member having a base provided with a substantially central aperture the boundary edge of which is adapted to engage the threads of a screw-threaded bolt or the like, and which base has a continuous band portion merged into and extending inwardly from a plurality of upstanding petal-like formations in edge contact to form a cap, parts of said formations being substantially flat to provide wrench-engaging surfaces.

2. A one piece preformed load sustaining nut comprising a member made from sheet metal, said member having a base provided with a substantially central aperture the boundary edge of which is adapted to engage the threads of a screw-threaded bolt or the like, and which base has a continuous band portion merged into and extending inwardly from angularly disposed upstanding substantially flat wrench-engaging surfaces and tapering edge-contacting cap portions.

3. A one piece preformed load sustaining nut comprising a member made from sheet metal, said member having a base provided with a substantially central aperture the boundary edge of which is adapted to engage the threads of a screw-threaded bolt or the like, and which base has a continuous band portion merged into and extending inwardly from a plurality of upstanding petal-like formations, each having short substantially parallel edges adjacent the root thereof, and tapering ends, said petal-like formations being in edge contact one with another, said formations having substantially flat surfaces between the respective parallel edges.

4. A one piece preformed load sustaining nut comprising a member made from sheet metal, said member having a base provided with a substantially central aperture, the material surrounding said aperture being distorted upwardly and helically to provide a thread for engagement with the threads of a bolt, and which base has a continuous band portion merged into and extending from angularly disposed upstanding substantially flat wrench-engaging surfaces and tapering edge-contacting cap portions.

JAMES ROWLAND HOTCHKIN.

CERTIFICATE OF CORRECTION.

Patent No. 2,288,710. July 7, 1942.

JAMES ROWLAND HOTCHKIN.

It is hereby certified that error appears in the printed specification of the above numbered patent requiring correction as follows: Page 2, second column, line 58, claim 4, before "from" insert --inwardly--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.